United States Patent [19]

Saito

[11] Patent Number: 4,989,262

[45] Date of Patent: Jan. 29, 1991

[54] DEMODULATOR WITH MULTIPLE INTERFERENCE CANCELLERS RESPONSIVE TO CORRELATIONS BETWEEN UNDESIRED SIGNALS AND ERROR SIGNALS

[75] Inventor: Masao Saito, Tokyo, Japan

[73] Assignee: NEC Corporation, Tokyo, Japan

[21] Appl. No.: 441,486

[22] Filed: Nov. 27, 1989

[30] Foreign Application Priority Data

Nov. 28, 1988 [JP] Japan .................................. 63-300319
Nov. 28, 1988 [JP] Japan .................................. 63-300320
Dec. 13, 1988 [JP] Japan .................................. 63-315295

[51] Int. Cl.$^5$ .............................................. H04B 1/10
[52] U.S. Cl. ..................................... 455/138; 455/139;
    455/273; 455/278; 455/303; 455/305; 375/102
[58] Field of Search ............... 455/138, 139, 303, 304,
    455/305, 273, 276, 278; 375/102

[56] References Cited

U.S. PATENT DOCUMENTS

| | | | |
|---|---|---|---|
| 3,681,695 | 8/1972 | Cease et al. | 455/304 |
| 3,965,422 | 6/1976 | Tagliaferri | 455/138 |
| 4,334,316 | 6/1982 | Tanaka | 455/304 |
| 4,736,544 | 4/1988 | Matsue et al. | 455/138 |
| 4,847,860 | 7/1989 | Robert | 455/304 |

Primary Examiner—Reinhard J. Eisenzopf
Assistant Examiner—Lisa Charonel

Attorney, Agent, or Firm—Sughrue, Mion, Zinn, Macpeak & Seas

[57] ABSTRACT

Undesired signals detected by a main antenna are cancelled by corresponding interference cancelling signals. The output of the main antenna is frequency converted to IF region and decomposed into first and second main baseband components. Decision circuits are provided for making a decision on whether each of the first and second main baseband components exceeds each of multiple thresholds and produces multibit codes as well as error signals. Auxiliary antennas respectively detect the undesired signals and feed auxiliary frequency converters for translating the frequency of the respective outputs of the auxiliary antennas to the intermediate frequency. Auxiliary quadrature demodulators are provided for respectively decomposing the output of each auxiliary frequency converter into first and second auxiliary baseband components. Correlations are detected between the first auxiliary baseband components and the first error signal and between the second auxiliary baseband component and the second error signal. Amplitude and phase controllers are responsive to the detected correlations to control the outputs of the auxiliary frequency converts to generate the interference cancelling signals. Variable length delay lines are associated respectively with the auxiliary antennas for introducing delays so that both cancelling signals and corresponding interfering components are time-coincident at the summing circuit.

3 Claims, 6 Drawing Sheets

DEMODULATOR WITH MULTIPLE INTERFERENCE CANCELLERS RESPONSIVE TO CORRELATIONS BETWEEN UNDESIRED SIGNALS AND ERROR SIGNALS

BACKGROUND OF THE INVENTION

The present invention relates generally to demodulators for digital radio communications systems, and more specifically to interference cancellation for cancelling interfering signals from undesired multiple sources.

According to a prior art interference cancellation technique as described in Japanese Patent No. 62-16580, an auxiliary antenna is employed for detecting undesired signal, which is supplied to a correlator and an amplitude and phase controller to produce a cancelling signal. Desired signal is detected by the mainlobe of a main antenna. The output of the main antenna is fed to a summing amplifier where it is combined with the cancelling signal to cancel the undesired signal which is also detected by a sidelobe of the main antenna. To derive the cancelling signal, correlation is detected between the outputs of the main and auxiliary antennas by the correlator and used as an input to the controller to modify the output of the auxiliary antenna both in amplitude and phase. Being derived from correlation between the undesired signals detected by the main and auxiliary antennas, the signal-to-noise ratio of the interference cancelling signal is not sufficient to cancel interference, particularly when it is desired to cancel interfering signals coming from multiple sources. Further, in cases where the desired signal is also detected by a sidelobe of the auxiliary antenna, the correlation between it and the desired signal on the main path will be detected by the correlator. Such correlation would act in a way to decrease the desired signal.

SUMMARY OF THE INVENTION

It is therefore an object of the present invention to provide a demodulator having a plurality of interference cancellers which respond to correlations between undesired signals from auxiliary antennas and error signals derived from the output of a main antenna.

According to the present invention, the demodulator comprises a main antenna having a main lobe for detecting a desired signal and sidelobes by which undesired signals may also be detected as interfering components. The output of the main antenna is converted to an intermediate frequency and supplied to a summing circuit where it is summed with plural interference cancelling signals. The output of the summing circuit is applied to a main quadrature demodulator for decomposing it into a first baseband component and a second baseband component. A first decision circuit having multiple thresholds makes a decision on whether the first baseband component exceeds each of the multiple thresholds, and produces a multibit code as a first channel output and a first error signal in accordance with the decision. A second decision circuit having multiple thresholds makes a decision on whether the second baseband component exceeds each of the last-mentioned multiple thresholds, and produces a multibit code as a second channel output and a second error signal in accordance with the last-mentioned decision. A plurality of auxiliary antennas respectively detect the undesired signals and respectively feed auxiliary frequency converters for translating the frequency of the respective output of the auxiliary antennas to the intermediate frequency. A plurality of auxiliary quadrature demodulators are provided for respectively decomposing the output of each auxiliary frequency converter into first and second baseband components. A plurality of pairs of first and second correlators are provided so that the first correlators respectively detect correlations between the first baseband components and the first error signal, and the second correlators respectively detect correlations between the second baseband components and the second error signal. A plurality of amplitude and phase controllers are associated respectively with the first and second correlators of a respective one of the pairs for controlling the outputs of the auxiliary frequency converters in response to the outputs of the associated first and second correlators to generate the interference cancelling signals. Variable length delay lines are associated respectively with the auxiliary antennas for introducing respective delays so that the interference cancelling signals and corresponding interfering components contained in the output of the main frequency converter are time-coincident at the summing circuit.

Since the amplitude and phase control signals are derived from correlations between signals detected by the auxiliary antennas and the error signals from the decision circuits, the signal-to-noise ratios of such control signals are sufficient to cancel multiple interfering signals and no harmful effect occurs on the desired signal even if it is detected by the auxiliary antennas.

BRIEF DESCRIPTION OF THE DRAWINGS

The present invention will be described in further detail with reference to the accompanying drawings, in which.

DETAILED DESCRIPTION

Figure 1:
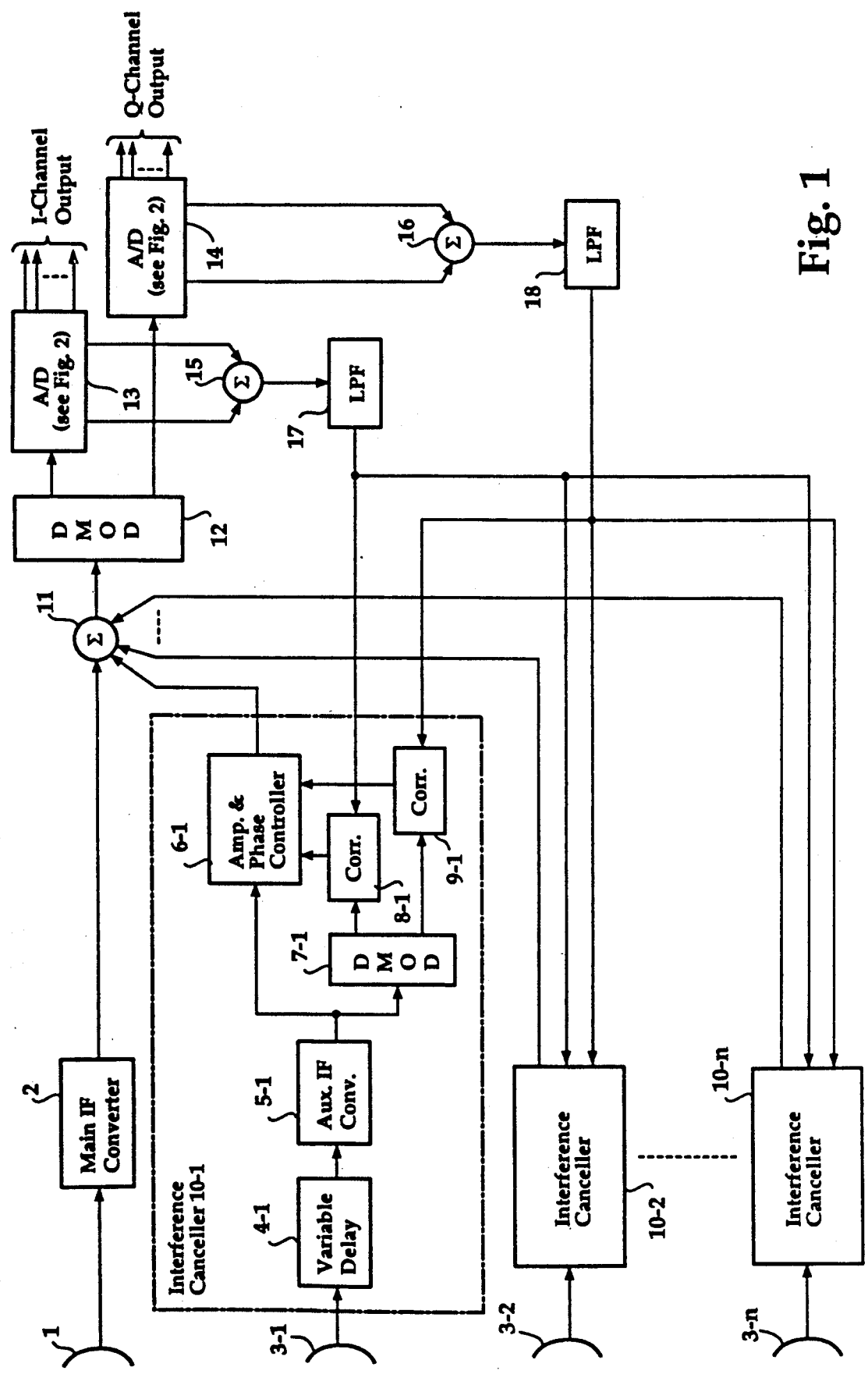
FIG. 1 is a block diagram of an embodiment of the present invention.

Referring now to FIG. 1, there is shown a digital modulator according to an embodiment of the present invention. The demodulator comprises a main antenna 1 and a plurality of auxiliary antennas 3-1 to 3-$n$. The main lobe of antenna 1 is so oriented that it receives incoming PSK or QAM signals from a desired transmitter station and its side lobes detect signals from a number of undesired interference sources. The output of antenna 1, containing both desired and undesired signals, is applied to a main IF converter 2 for intermediate frequency translation and coupled to a summing amplifier 11 where it is summed with interference cancelling signals. The output of summing amplifier 11 is applied to a quadrature demodulator 12 where the incoming signals are decomposed into an inphase component and a quadrature component and supplied respectively as I-channel and Q-channel baseband signals to analog-to-digital converters 13 and 14.

Figure 2:
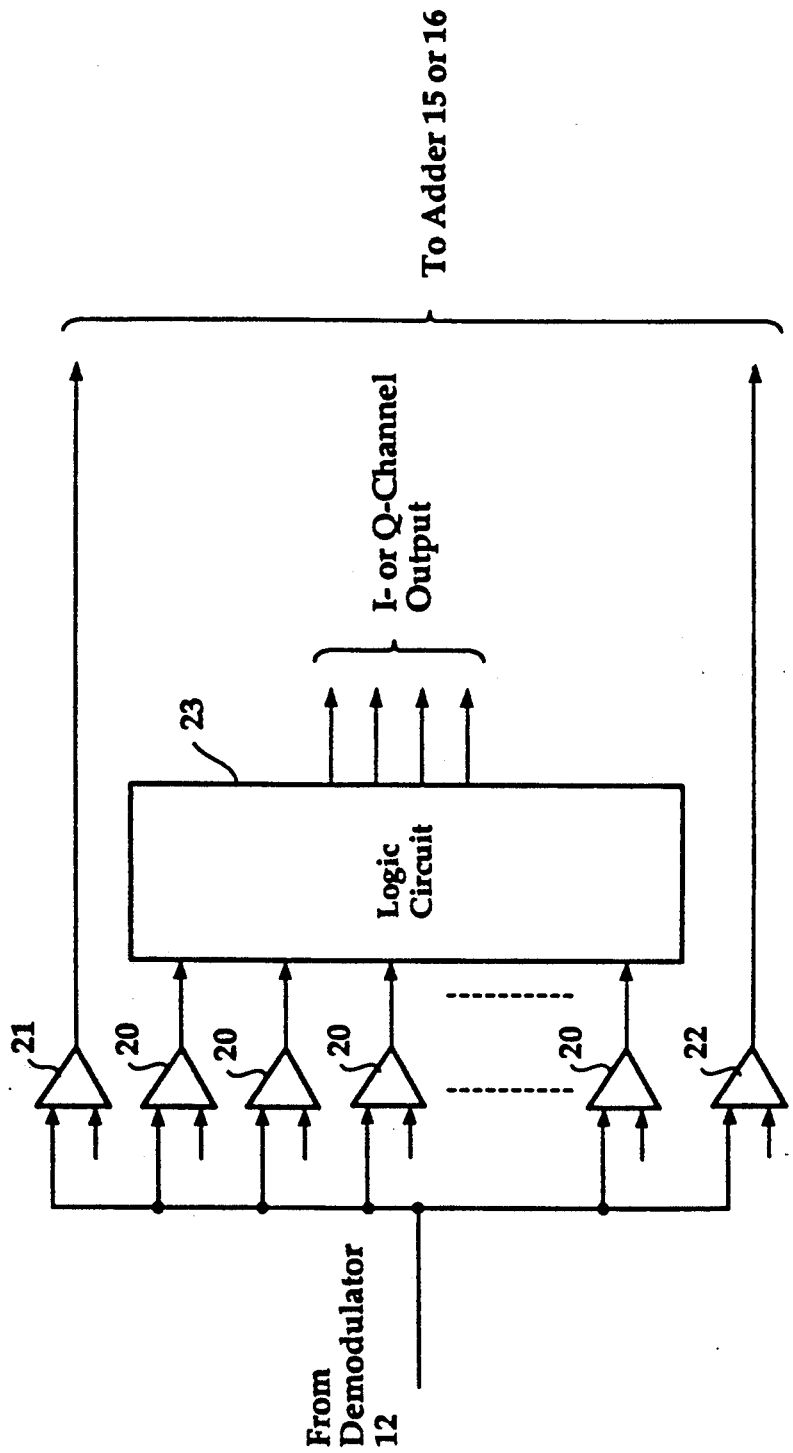
FIG. 2 is a block diagram of each A/D converter of FIG. 1.

As shown in FIG. 2, each of the analog-to-digital converters 13 and 14 includes a plurality of comparators 20, each of which compares the amplitude of the respective channel signal with one of successively increasing decision thresholds to make a decision in favor of logic-1 when the respective threshold is exceeded or in favor of logic-0 when the threshold is not exceeded. The outputs of comparators 20 are coupled to a logic circuit 23 to provide a multibit digital code as an I- or Q-channel output. Comparators 21 and 22 are provided to detect signals that exceed beyond the upper and lower limits of the specified decision thresholds and produce error bits for application to an adder 15 or 16.

Returning to FIG. 1, the error outputs of A/D converter 13 are summed by adder 15 and fed to a low-pass filter 17 to produce a phase error signal in analog form, while the error outputs of A/D converter 14 are summed by adder 16 and fed to a low-pass filter 18 to produce an analog amplitude error signal.

On the other hand, auxiliary antennas 3-1 to 3-$n$ have their main lobes respectively so oriented to detect signals from the interference sources. The signal from the desired transmitter station may also be detected by the auxiliary antennas. The outputs of auxiliary antennas 3-1 through 3-$n$ are coupled respectively to interference cancellers 10-1 through 10-$n$ of identical circuitry. For purposes of simplicity, only one interference canceller 10-1 is shown in detail.

Interference canceller 10-1 comprises a variable length delay line 4-1 through which the output of antenna 3-1 is coupled to an auxiliary IF converter 5-1 for translation to intermediate frequency. The output of IF converter 5-1 is applied to an amplitude and phase controller 6-1 as well as to a quadrature demodulator 7-1. The IF version of the undesired signal detected by antenna 3-1 is decomposed into an I-channel baseband signal and a Q-channel baseband signal. The I-channel component of the undesired signal is supplied to a correlator 8-1 to detect the correlation with a phase error contained in the output of low-pass filter 17, while the Q-channel component of the undesired signal is supplied to a correlator 9-1 to detect the correlation with an amplitude error contained in the output of low-pass filter 18. The outputs of correlators 8-1 and 9-1 are supplied to amplitude and phase controller 6-1 to respectively control the phase and amplitude of the undesired IF signal. The output of amplitude and phase controller 6-1 is an interference cancelling signal and is applied to the summing amplifier 11 to which the outputs of other cancellers 3-2 to 3-$n$ are also applied. The undesired signal on the main path and the cancelling signal are of substantially equal magnitude, but of opposite phase at the summing amplifier 11 to cancel the interference.

Figure 3:
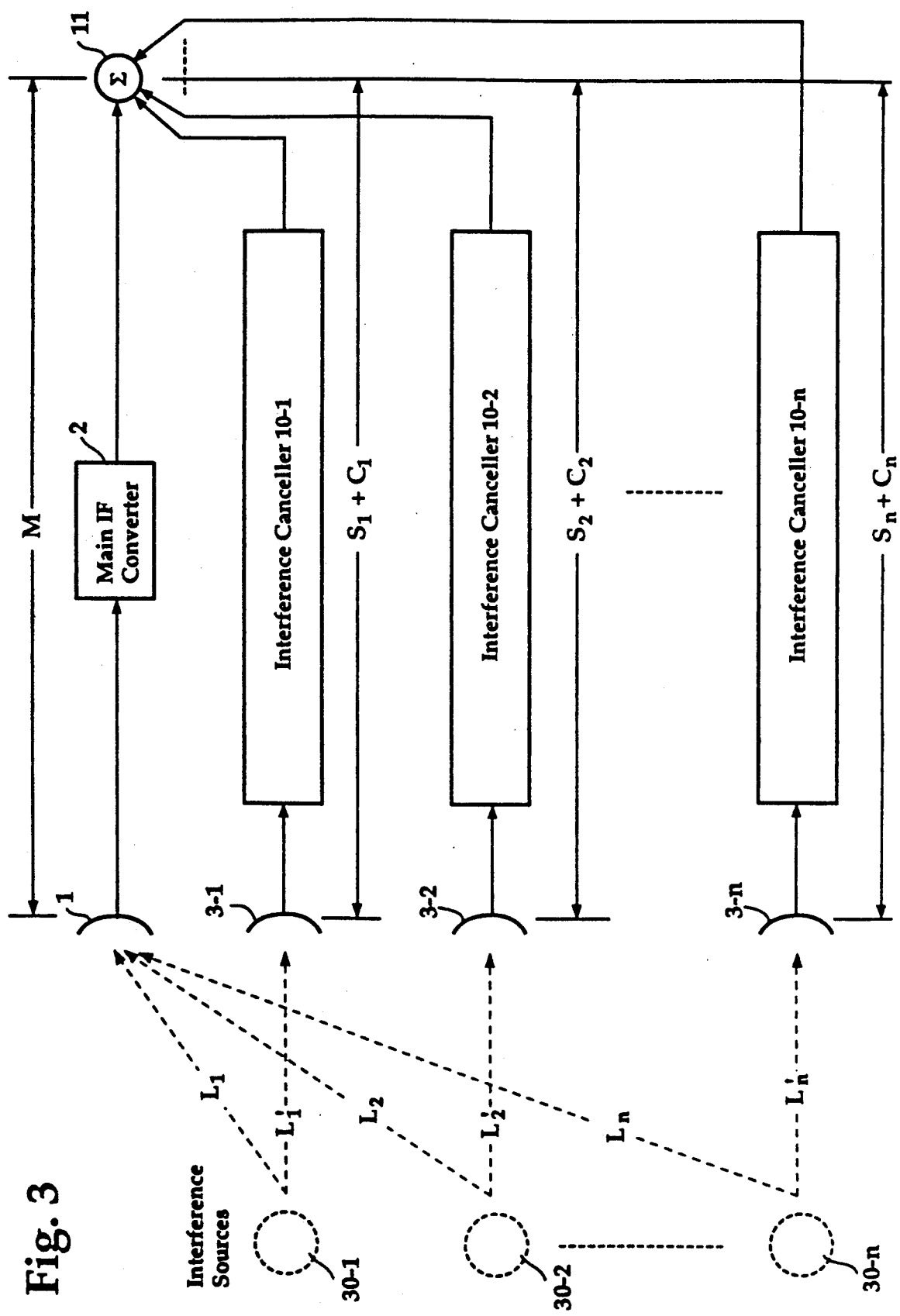
FIG. 3 is a symbolic representation of the FIG. 1 embodiment for adjusting delay lines.

The variable delay line 4-1 is manually adjusted to introduce a delay time so that the interference cancelling signal of canceller 10-1 and the corresponding undesired signal detected by the main antenna 1 arrive at the same time at the respective inputs of summing amplifier 11. As illustrated in FIG. 3, the variable delay line 4-1 is adjusted to introduce a path length $C_1$ so that the total of the electrical length $L'_1$ from an interference source 30-1 to antenna 3-1 plus the electrical length $S_1$ from antenna 3-1 with the added electrical length $C_1$ to the summing amplifier 11 is equal to the total of the electrical length $L_1$ from the interference source 30-1 to antenna 1 plus the electrical length M from main antenna 1 to the summing amplifier 11. The phase difference due to path length difference between the main path and the canceller 10-1 can be reduced to a minimum with this delay adjustment, and the phase difference due to a time-varying factor can be compensated for by the output of correlator 8-1.

Even if the source of desired signal is located in such a position that the desired signal is also detected by antenna 3-1 and time-coincident with the desired signal on the main electrical at the summing amplifier 11, no harmful effect occurs since the signals from the low-pass filters 17 and 18 are both indicative of errors.

Likewise, the variable length delay line of interference canceller 10-2 is independently adjusted to introduce an additional electrical length $C_2$ so that so that the total of the electrical length $L'_2$ from an interference source 30-2 to antenna 3-2 plus the electrical length $S_2$ from antenna 3-2 with the added electrical length $C_2$ to the summing amplifier 11 is equal to the total of the electrical length $L_2$ from the interference source 30-2 to antenna 1 plus the electrical length M from antenna 1 to the summing amplifier 11. In this way, the interfering signals from sources 30-2 through 30-$n$ can also be precisely cancelled at the summing amplifier 11 by the outputs of the individual cancellers 10-2 through 10-$n$.

Figure 4:
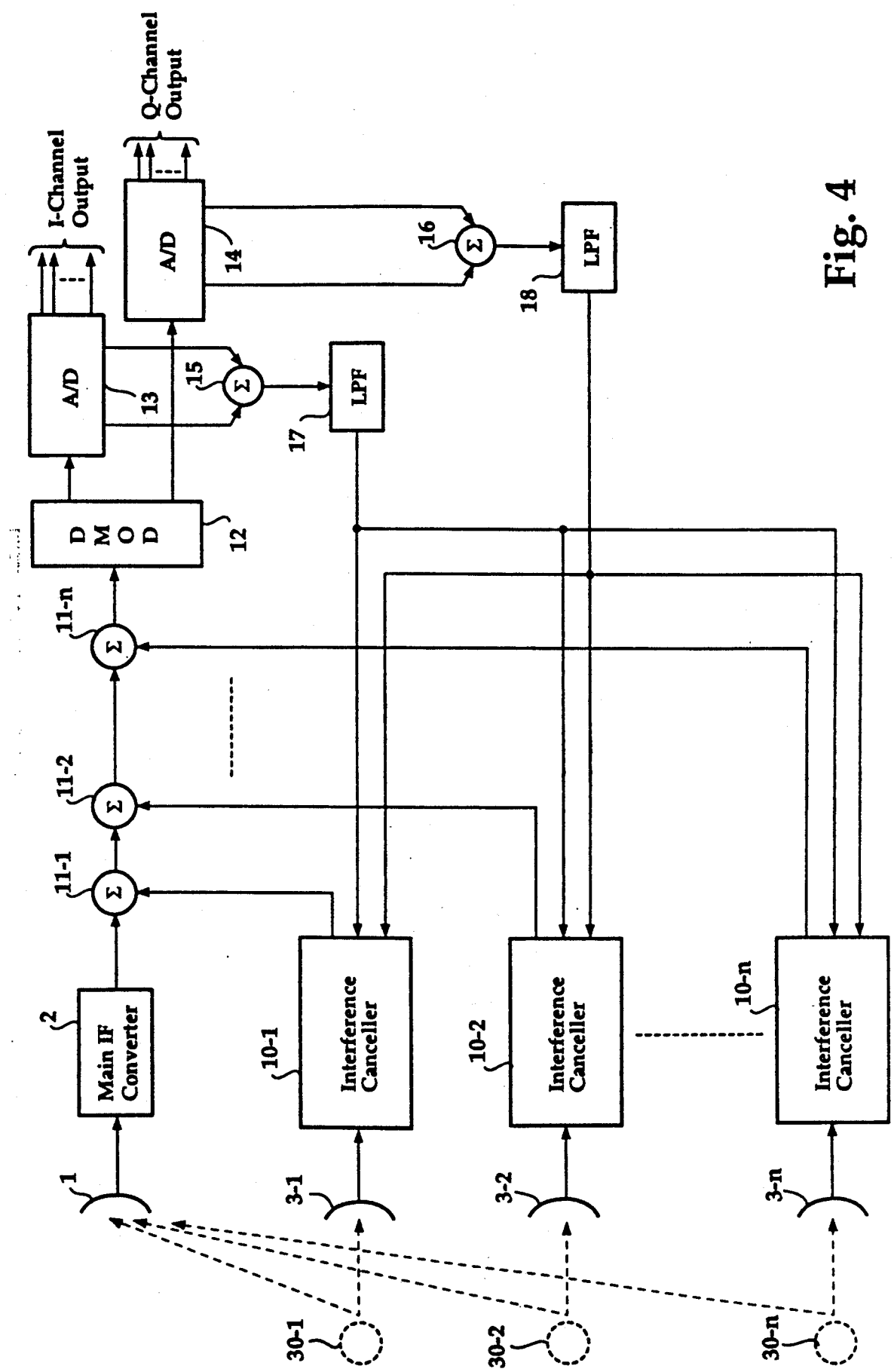
FIG. 4 is a block diagram of an alternative embodiment of the invention.
Figure 5:
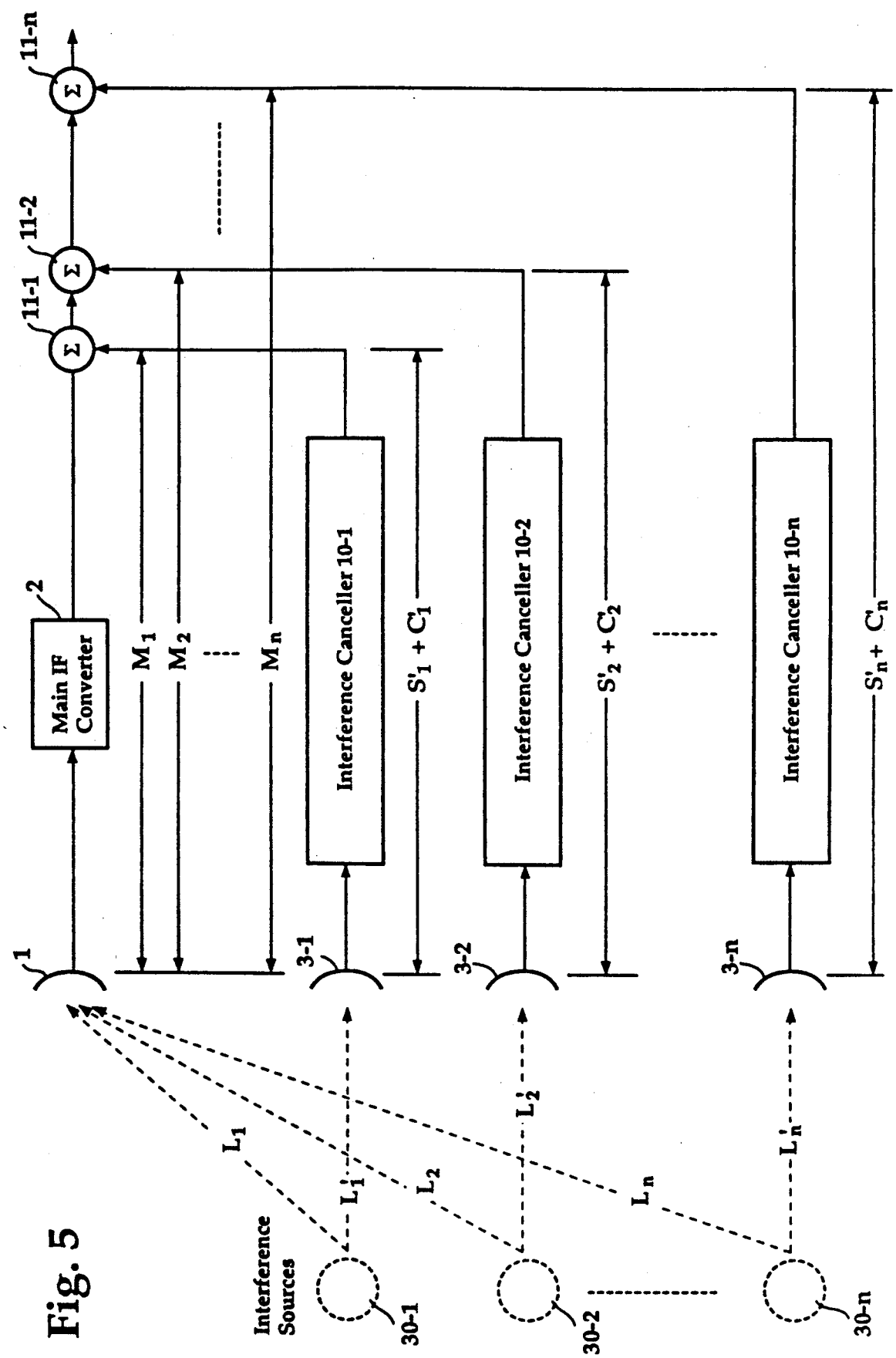
FIG. 5 a symbolic representation of the FIG. 1 embodiment for adjusting delay lines associated with the embodiment of FIG. 4.

FIG. 4 is an illustration of an alternative embodiment of the present invention which differs from the previous embodiment in that it replaces the summing amplifier 11 with a series of cascaded summing amplifiers 11-1 through 11-$n$ provided respectively for the cancellers 10-1 to 10-$n$. Multiple undesired signals from sources 30-1 through 30-$n$ are cancelled respectively at the summing amplifiers 11-1 through 11-$n$ by respectively adjusting the delay lines of cancellers 10-1 through 10-$n$ to introduce an electrical length $C'_i$ so that $L_i + M_i$ equals $L'_i + S'_i C'_i$ (where $i = 1, 2 \ldots n$) as shown in FIG. 5.

Figure 6:
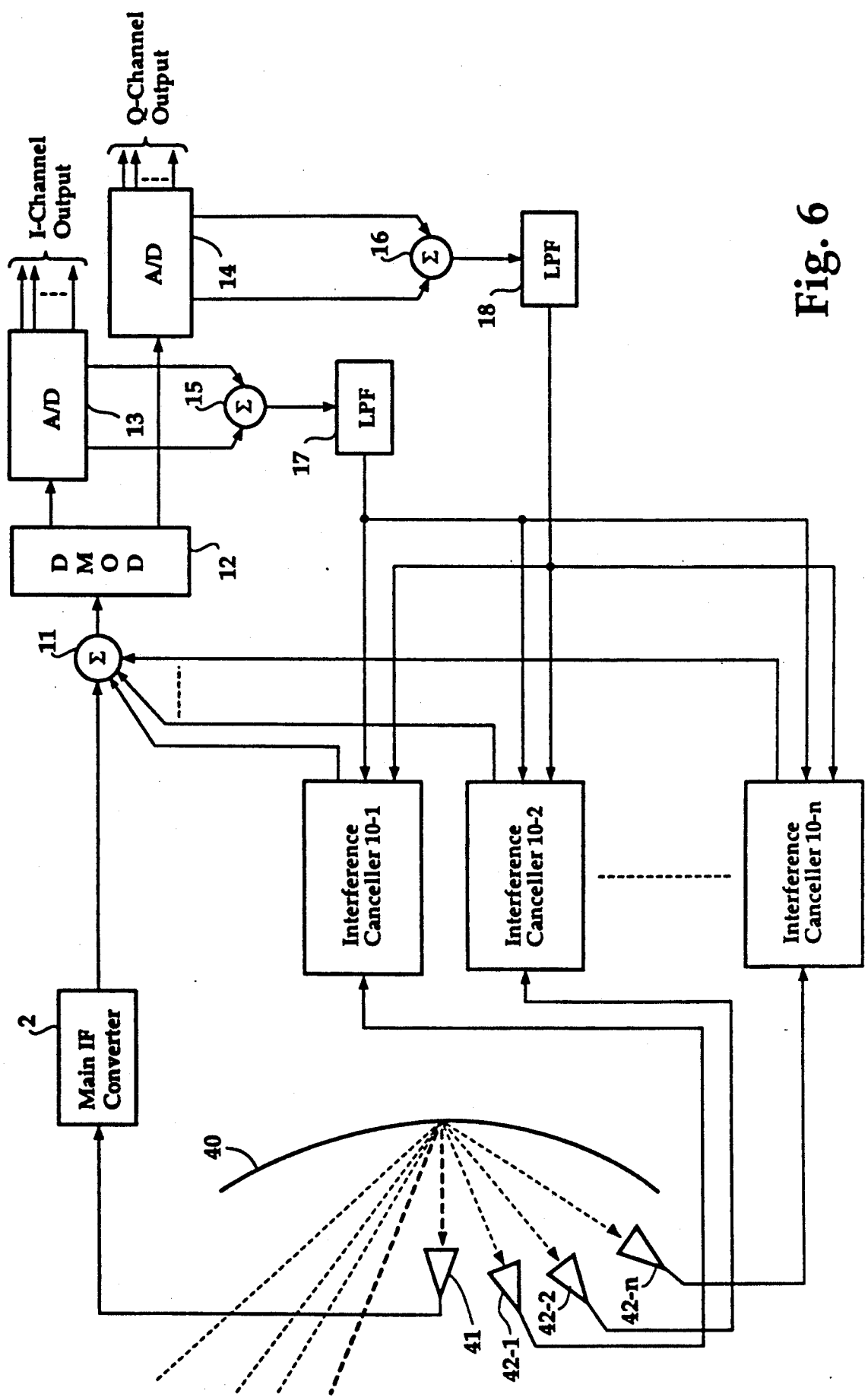
FIG. 6 is a block diagram of another embodiment using a modified antenna system.

Instead of using separate auxiliary antennas 3, an arrangement shown in FIG. 6 can be advantageously employed in the present invention. In this embodiment, the antenna system comprises a parabolic reflector 40 upon which all incoming radio signals are reflected, a main feeder 41 and a plurality of auxiliary feeders 42-1 through 42-$n$. Main feeder 41 is oriented to detect one of the reflected signals which is desired and the auxiliary feeders are respectively oriented to detect undesired signals. The output of main feeder 41 is connected to the main IF converter 2, and the outputs of auxiliary feeders 42-1 through 42-$n$ are connected respectively to the inputs of interference cancellers 10-2 through 10-$n$.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A demodulator comprising:
   a main antenna having a main lobe for detecting a desired signal and sidelobes by which undesired signals may also be detected as interfering components;
   a main frequency converter for translating the frequency of the output of said main antenna to an intermediate frequency;
   summing means for summing the output of said main frequency converter with interference cancelling signals;

a main quadrature demodulator for decomposing the output of said summing means into a first main baseband component and a second main baseband component;

first decision means having multiple thresholds for making a decision on whether said first main baseband component exceeds each of said multiple thresholds, and producing a multibit code as a first channel output and a first error signal in accordance with said decision;

second decision means having multiple thresholds for making a decision on whether said second main baseband component exceeds each of the last-mentioned multiple thresholds, and producing a multibit code as a second channel output and a second error signal in accordance with the last-mentioned decision;

a plurality of auxiliary antennas for respectively detecting said undesired signals;

a plurality of auxiliary frequency converters for translating the frequency of the respective output of the auxiliary antennas to said intermediate frequency;

a plurality of auxiliary quadrature demodulators for respectively decomposing the output of each of said auxiliary frequency converters into first and second auxiliary baseband components;

a plurality of pairs of first and second correlators, the first correlators respectively detecting correlations between said first auxiliary baseband components and said first error signal, and said second correlators respectively detecting correlations between said second auxiliary baseband components and said second error signal;

a plurality of amplitude and phase control means associated respectively with the first and second correlators of a respective one of said pairs for controlling the outputs of said auxiliary frequency converters in response to the outputs of the associated first and second correlators to generate said interference cancelling signals; and a plurality of variable length delay lines associated respectively with said auxiliary antennas for introducing respective delays so that said interference cancelling signals and corresponding interfering components contained in the output of said main frequency converter are time-coincident at said summing means.

2. A demodulator as claimed in claim 1, wherein said summing means comprises a series of summing amplifiers cascaded between said main frequency converter and said main quadrature modulator, said summing amplifiers respectively receiving said interference cancelling signals, said variable length delay lines introducing respective delays so that said interfering cancelling signals and corresponding interfering components contained in the output of said main frequency converter are time-coincident at said respective summing amplifiers.

3. A demodulator as claimed in claim 1, wherein said main antenna and said auxiliary antennas comprise a parabolic reflector for reflecting said desired signal and said undesired signals, a main feeder oriented to detect the desired signal reflected off said parabolic reflector, and a plurality of auxiliary feeders oriented respectively for detecting the undesired signals reflected off said parabolic reflector.

* * * * *

UNITED STATES PATENT AND TRADEMARK OFFICE
CERTIFICATE OF CORRECTION

PATENT NO. : 4,989,262
DATED : January 29, 1991
INVENTOR(S) : Masao Saito

It is certified that error appears in the above-identified patent and that said Letters Patent is hereby corrected as shown below:

In the Abstract, line 22, delete "converts" and insert --converters--;

Col. 4, line 14, delete the second occurrence of "so that".

Signed and Sealed this

Ninth Day of March, 1993

Attest:

STEPHEN G. KUNIN

Attesting Officer

Acting Commissioner of Patents and Trademarks